United States Patent [19]

Bartholic

[11] 4,448,674

[45] May 15, 1984

[54] CONTROL OF EMISSIONS IN FCC REGENERATOR FLUE GAS

[75] Inventor: David B. Bartholic, Watchung, N.J.

[73] Assignee: Engelhard Corporation, Edison, N.J.

[21] Appl. No.: 354,320

[22] Filed: Mar. 3, 1982

Related U.S. Application Data

[63] Continuation of Ser. No. 26,011, Apr. 2, 1979, abandoned.

[51] Int. Cl.$^3$ .................. C10G 11/04; C10G 11/18
[52] U.S. Cl. .................................. 208/113; 208/164; 423/244; 502/34
[58] Field of Search .................. 208/113; 252/417; 423/244

[56] References Cited

U.S. PATENT DOCUMENTS

| | | | |
|---|---|---|---|
| 3,699,037 | 10/1972 | Annesser et al. | 208/120 |
| 3,966,879 | 6/1976 | Groenendaal et al. | 423/244 |
| 4,061,476 | 12/1977 | Holter et al. | 423/244 X |
| 4,071,436 | 1/1978 | Blanton et al. | 208/120 |
| 4,146,463 | 3/1979 | Radford et al. | 208/120 |
| 4,153,535 | 5/1979 | Vasalos et al. | 208/120 |
| 4,284,494 | 8/1981 | Bartholic et al. | 208/164 |
| 4,325,817 | 4/1982 | Bartholic et al. | 208/164 |

OTHER PUBLICATIONS

Dautzenberg, Shell's Flue Gas Desulfurization Process, Chemical Engineering Progress, pp. 86-91 (Aug. 1971).
Ctvrtnicek, Refinery Catalytic Cracker Regenerator $SO_x$ Control Process Survey, EPA Report No. 650/2-74-082 (Sep. 1974).
Kittrell, Impact of $SO_x$ Emissions Control on Petroleum Refining Industry, Technical Report Data Sheet and Appendix L, EPA Report No. 600/2-76-161a (Jun. 1976).
Ctvrtnicek, Refinery Catalytic Cracker Regenerator $SO_x$ Control—Steam Stripper Laboratory Test, EPA Report No. 650/2-74-082-a (Nov. 1974).
Cusumano, Evaluation of Reactive Solids for $SO_2$ Removal During Fluidized-Bed Coal Combustion, EPRI Report No. TPS75-603 (Oct. 1975).
Lowell, Identification of Regenerable Metal Oxide $SO_2$ Sorbents for Fluidized-Bed Coal Combustion, EPA Report No. 650/2-75-065 (Jul. 1975).
Cheremisinoff, Control of Gaseous Air Pollutants, Pollution Engineering, pp. 30-36 (May 1976).
Cheremisinoff, Wet Scrubbers-A Special Report, Pollution Engineering, pp. 33-43 (May 1974).

*Primary Examiner*—Delbert E. Gantz
*Assistant Examiner*—George E. Schmitkons
*Attorney, Agent, or Firm*—David W. Plant; Richard M. Barnes

[57] ABSTRACT

A system is described for control of sulfur oxides in emissions to the atmosphere from regenerators of cyclic Fluid Catalytic Cracking Units (FCC). By the disclosed system, hot regenerator flue gas is cooled, air (oxygen) is injected into the cooled flue gas unless oxygen is already present, and then the cooled flue gas is contacted with a solid particulate material which has the capability of associating with and binding sulfur oxides in the flue gas to form a stable solid material which is separated from the gases.

16 Claims, 1 Drawing Figure

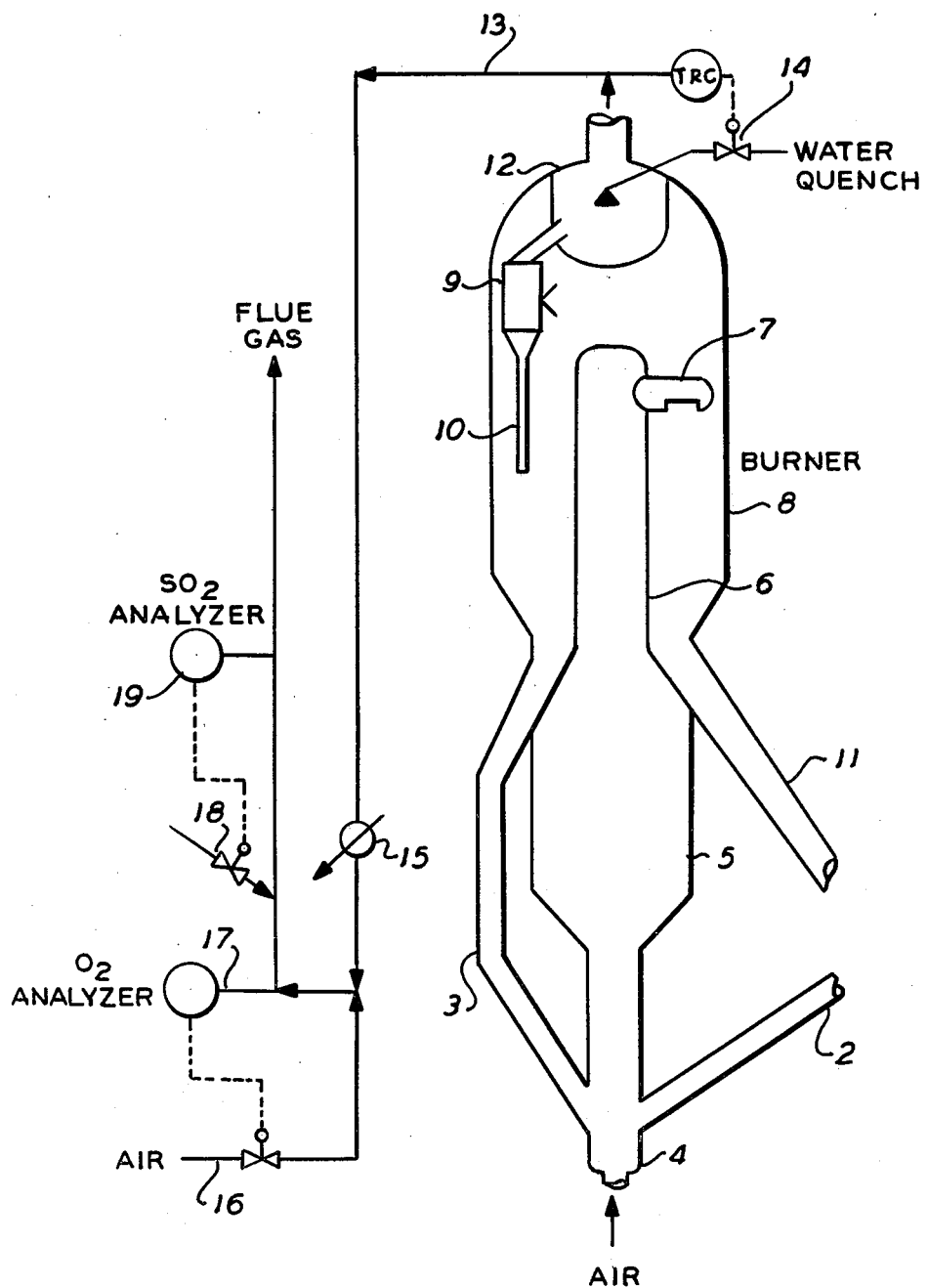

CONTROL OF EMISSIONS IN FCC REGENERATOR FLUE GAS

This application is a continuation of application Ser. No. 026,011, filed Apr. 2, 1979, now abandoned.

FIELD OF THE INVENTION

The invention is concerned with the operation of catalytic cracking units, especially FCC units, for control of undesirable gases in the flue gas released from the regenerators. More particularly, the invention provides an improvement on known techniques for reducing the content of sulfur oxides in regenerator flue gas by contact with a solid capable of binding sulfur oxides. The invention contemplates selective removal of $SO_x$ without oxidation of CO in the flue gas by a solid-gas phase contact downstream of regenerator cyclones between cooled flue gas containing a source of oxygen and finely divided particulate solid capable of associating with and binding oxides of sulfur and separating the solid so-contacted from the flue gases before discharging the gases into the atmosphere.

BACKGROUND OF THE INVENTION

Catalytic cracking of hydrocarbon feedstocks has been characterized by certain basic steps repeated in cyclic manner. The catalysts are generally highly porous solids characteristically having extensive surface area and possessing acidic sites. During a relatively short period of time, hydrocarbon charge, such as gas-oil, undergoes profound conversions of a complex nature on contact with those surfaces at elevated temperatures upwards of about 850° F. and essentially atmospheric pressure. The temperatures may range up to about 1000° F. and the pressure on incoming charge is usually only enough to overcome pressure drop through the reactor and associated produce recovery facilities, say 30 to 50 psig.

The conversions taking place in the presence of the cracking catalyst include scission of carbon-to-carbon bonds (simple cracking), isomerization, polymerization, dehydrogenation, hydrogen transfer and others leading to lighter, lower molecular weight compounds as important desired products. In many installations motor gasoline of end point near about 400° F. is a primary product and cracking units are often operated to maximize high quality gasoline within constraints imposed by ability to profitably market the unavoidable by-products such as butane and lighter. In addition to the gaseous by-products, the reactions on cracking catalyst also produce hydrocarbons of very low volatility and very high carbon content which remain on the active surfaces of the catalyst and mask the active sites, rendering the catalyst inactive. Those deposits of heavy carbonaceous matter (commonly called "coke") can be removed by burning with air to restore the active surface and thus regenerate the activity of the catalyst. Typically the coke contains about 6–7% hydrogen on a weight basis. In commercial plants for practice of catalytic cracking, catalyst inactivated by coke is purged of volatile hydrocarbons, as by steaming, and contacted with air at elevated temperature to burn off the coke.

Combustion of the coke generates carbon dioxide, carbon monoxide and water as combustion products and releases large amounts of heat. To a very considerable extent, the heat so released has been applied to supply the endothermic heat of reaction during the cracking phase of the cycle. In its earliest stages, catalytic cracking was conducted in fixed beds of catalyst provided with exchange tubes through which a heat transfer fluid was circulated to abstract heat during regeneration and supply heat during cracking. Continuity of operation was achieved by a complex system of manifolds and valves serving a plurality of reactors such that one is used for cracking while two or more others were purged of volatiles, regenerated, again purged and ready to assume the cracking function as catalyst in the first reactor became spent.

Further development made available systems in which the catalyst is moved continuously through a reactor, purged, transferred to a regenerator, again purged and returned to the reactor. These moving catalyst systems are able to dispense with the circulating heat transfer medium and instead employ the catalyst itself as a medium for conveying heat from the regenerator to the reactor. The early catalysts such as acid-treated clays, and synthetic amorphous silica-alumina composites, resulted in deposition of quantities of coke in excess of the amounts which on complete combustion to carbon dioxide and water will supply the heat of reaction required by the reactor. In some installations, a portion of the heat was withdrawn by heat exchange coils in the regenerator. That practice was followed in the moving compact bed process known as Thermofor Catalytic Cracking (TCC). Another expedient is to circulate a portion of catalyst from the regenerator through a cooling heat exchanger and back to the regenerator. That practice was found suitable for systems in which a finely divided catalyst is suspended in the hydrocarbon charge in the reactor and in the combustion air in the regenerator. These suspended catalyst systems applied the fluidized solids phenomenon and are classed generally as Fluid Catalytic Cracking (FCC).

Characteristic of all the systems for many years was a high content of carbon monoxide (CO) in the flue gas from the regenerator, a result of incomplete combustion or partial utilization of the fuel value of the coke. CO in the flue gas is undesirable for other reasons. That combustible gas can burn in regenerator gas discharge equipment and in flues leading to temperatures which damage those facilities. The loss of potential fuel value has been avoided by providing "CO boilers" in which the CO is burned in contact with steam generation tubes, thus recovering sensible heat from the flue gas as well as fuel value of the CO.

As designs of moving catalyst systems for charging heavier stocks were developed, the cracker received some hydrocarbons in liquid form, requiring heat input for vaporization of charge, heating the charge to reaction temperature and for endothermic heat of reaction. The "heat balanced" FCC design aids in satisfaction of these requirements. Typically, that design provides a heat sensor in the reacted vapors before removal from the reactor. An automatic control of the valve in the line for return of hot regenerated catalyst from the regenerator to the reactor assures return of that amount of hot regenerated catalyst which will maintain reactor top temperature at a desired set point. It will be seen that this control also sets an important reactor parameter, namely ratio of catalyst to oil (C/O), corresponding to space velocity in fixed bed reactors. It follows that, for a given set of regenerator conditions, C/O is a dependent variable not subject to independent control by the operator.

The advent of zeolite cracking catalyst as described in U.S. Pat. No. 3,140,249 introduced new considerations in catalytic cracking design and practice. Such catalysts are highly active, inducing more profound conversion of hydrocarbon charge stock than the older catalysts. In addition, they are some selective in that a larger proportion of the conversion products are motor gasoline components with lesser proportions of gas and coke. Because of that increased selectivity, the zeolite cracking catalyst rapidly became the catalyst of choice, particularly in areas of high gasoline demand, such as the United States. The more active catalyst has been effectively applied in FCC Units at short catalyst contact times, such as the modern riser reactor units in which hot catalyst is dispersed in a column of charge rising through a conduit to an enlarged catalyst disengaging zone. Contact times of 20 seconds or less are common practice in such units. Such short contact times place a premium on high activity of the catalyst. Since activity of the regenerated catalyst is a function of residual coke remaining on the catalyst after regeneration, it becomes important to reduce residual coke to the lowest level economically attainable.

The extent of coke burning is a function of time and temperature. Rate of coke burning increases with increased temperature. In any given installation, the volume of the regenerator imposes a constraint on time of contact between catalyst and regeneration air. Temperature of regeneration is constrained by thermal stability of the catalyst, which suffers unduly rapid loss of activity on exposure to moisture of the regeneration air at temperatures upwards of about 1400° F. In addition, the regeneration temperature must be held to a level which will not cause damage to vessel internals. As regeneration gas rises from a dense bed in a regenerator, burning of CO can take place in a "dilute phase" containing only a small amount of catalyst. Because there is very little catalyst to absorb the heat thus released, the temperature of the gas rises rapidly and may reach levels which cause damage to the cyclones which separate entrained catalyst from regenerator fume, plenum chambers and flues for discharge of the flue gas. This may be combatted by injecting water or steam to these internals.

Better techniques have been recently proposed and adopted in many plants. According to the system of U.S. Pat. No. 3,909,392, catalyst from the dense bed of the regenerator is educted through tubes to the disperse phase, thus providing catalyst mass to absorb heat of CO combustion and return that heat to the dense bed as the catalyst falls back into that bed. A widely practiced technique causes CO combustion to take place in the dense bed by use of a catalyst promoted with platinum or the like in very small amounts. See U.S. Pat. No. 4,072,600. By transferring the heat of burning CO to the dense bed, these developments make higher regeneration temperatures available to regenerate catalyst to lower residual coke levels, hence higher activity.

Regeneration temperatures above 1250° F., preferably around 1300° F. and up to about 1375° F., become feasible at residual coke levels of less than 0.1% by weight on catalyst. The necessary result of regeneration at these increased temperatures is that the automatic control to maintain preset reactor top temperature will reduce the rate of catalyst flow from regenerator to reactor below the rates for lower regeneration temperature, thus reducing C/O. In addition, catalyst at these high temperatures will heat a portion of the charge to excessive levels at which thermal cracking occurs with resultant production of gas, olefins and coke.

Operators of FCC Units have also been concerned about emissions of sulfur dioxide and sulfur trioxide ($SO_x$) in the regenerator flue gas. The hydrocarbon feeds processed in commercial FCC units normally contain sulfur. It has been found that about 2-10% or more of the sulfur in a hydrocarbon stream processed in an FCC system is transferred from the hydrocarbon stream to the cracking catalyst, becoming part of the coke formed on the catalyst particles within the FCC cracking or conversion zone. This sulfur is eventually removed from the conversion zone on the coked catalyst which is sent to the FCC regenerator. Accordingly, about 2-10% or more of the feed sulfur is continuously passed from the conversion zone into the catalyst regeneration zone with the coked catalyst in an FCC unit.

In an FCC catalyst regenerator, sulfur contained in the coke is burned, along with the coke carbon, forming primarily gaseous sulfur dioxide and sulfur trioxide. These gaseous sulfur compounds become part of the flue gas produced by coke combustion and are conventionally removed from the regenerator in the flue gas.

It has been shown that $SO_x$ in the regenerator flue gas can be substantially cut back by including in the circulating catalyst inventory an agent capable of reacting with an oxide of sulfur in an oxidizing atmosphere or an environment which is not of substantial reducing nature to form solid compounds capable of reduction in the reducing atmosphere of the FCC reactor to yield $H_2S$. Upon such reduction, the sulfur leaves the reactor as gaseous $H_2S$ and organic compounds of sulfur resulting from the cracking reaction. Since these sulfur compounds are detrimental to the quality of motor gasoline and fuel gas by-products, the catalytic cracker is followed by downstream treating facilities for removal of sulfur compounds. Thus the gaseous fractions of cracked product may be scrubbed with an amine solution to absorb $H_2S$ which is then passed to facilities for conversion to elemental sulfur, e.g. a Claus plant. The additional $H_2S$ added to the cracker product stream by chemical reduction in the reactor of the solid sulfur compounds formed in the regenerator imposes little additional burden on the sulfur recovery facilities.

The technology heretofore proposed has involved circulating the $SO_x$ binding agent, the latter either being an integral part of the cracking catalyst particles or taking the form of separate particles having essentially the same fluidization properties as the cracking catalyst. Suitable agents for the purposes have been described in a number of previously published documents. Discussion of a variety of oxides which exhibit the property of combining with $SO_x$ and thermodynamic analysis of their behavior in this regard are set out by Lowell et al., SELECTION OF METAL OXIDES FOR REMOVING $SO_X$ FROM FLUE GAS, IND. ENG. CHEM. PROCESS DES. DEVELOP., Vol. 10, No. 3 at pages 384-390 (1971).

An early attempt to reduce $SO_x$ emission from catalytic cracking units, as described in U.S. Pat. No. 3,699,037, involves adding particles of a Group II metal compound, especially calcium or magnesium oxide, to a cracking unit cycle at a rate at least as great as the stoichiometric rate of sulfur deposition on the cracking catalyst, the additive preferably being injected into the regeneration zone in the form of particles greater than 20 microns. Particle size was chosen to assure a relatively long residence time in the unit. In putting the invention into practice, the Group II metal compound is recycled at least in part between the reactor and the regenerator, the remainder leaving the cycle along with catalyst fines entrained in regenerator flue gas. Subsequently it was proposed to incorporate the alkaline earth metal compound in the cracking catalyst particles by impregnation in order to minimize loss of the sulfur acceptor in the regenerator flue gases. See U.S. Pat. No. 3,835,031. This patent apparently recognizes the need for free oxygen for binding $SO_x$ with a Group II metal oxide since the equations for the reaction taking place in the regenerator is summerized as follows:

$$MgO + SO_2 + \tfrac{1}{2}O_2 = MgSO_4$$

Similar use of reactive alumina either as a discrete fluidizable entities or as a component of catalyst particles is described in U.S. Pat. Nos. 4,071,436; 4,115,250 and 4,115,251. Use of oxidants including platinum or chromium as adjuncts to alumina is suggested in these patents. A related use of cerium oxide on an alumina support is described in U.S. Pat. No. 4,001,375.

In the prior art techniques aforementioned, emphasis was on reversibly reacting sulfur oxides in the flue gas, and doing so while the gases were still in the regenerator. Since the sulfur loaded particles were carried to the reactor to be converted to gaseous hydrogen sulfide under the reducing atmosphere created by the cracking operation, the agents used to bind and then release sulfur were necessarily limited to those inherently capable of doing so under the constraints of temperature and time imposed by the operation of the reactor and the regenerator. Such procedures offer promise as means to reduce $SO_x$ emissions from refineries but they leave much to be desired.

With units operating with high sulfur feedstock, relatively large amounts of sulfur acceptor are needed to accomplish reductions in sulfur oxide levels. This will result in appreciable dilution of the active catalyst in the cracking reaction cycle whether the sulfur acceptor is a part of the catalyst particles or is present as discrete entities circulated with catalyst inventory. A basic limitation is that conditions of time and temperature for operating cyclic cracking units, especially heat balanced FCC units, are geared to maximizing production of desired products and conditions that will favor this result, are by no means those that are optimum for reversibly reacting sulfur oxides in the regenerator and carrying the sulfur back to the reactor for conversion at least in part to hydrogen sulfide. The generally recognized need or desirability of having excess oxygen in the regenerator beyond that needed to burn coke, in order to convert oxides to sulfur of trioxide which will then react with metal oxide to form a sulfate, imposes severe limitations on those refineries that operate regenerators in conventional mode, i.e., without full combustion. Thus, introduction of air (oxygen) to promote $SO_x$ association with metal oxide is basically inconsistent with the operation of a regenerator in conventional incomplete combustion mode.

SUMMARY OF THE INVENTION

The efficiency of removing $SO_x$ from FCC flue gas by solid particulate sulfur oxide acceptors such as reactive metal oxides is improved in accordance with the invention by contacting oxygen-containing flue gas with particulate sulfur oxide acceptor at a temperature below that prevailing upstream of cyclones in the regenerator. That principle is applied in accordance with this invention by cooling the regenerator flue gases downstream of cyclones, separating regenerated catalyst from combustion gases, injecting air (oxygen) into the cooled flue gas to provide sufficient free oxygen for oxidation of $SO_x$, unless the flue gas already contains such amount of oxygen, and contacting the cooled oxygen-containing flue gases with finely divided suspendable particulate solid sulfur oxide acceptor. Usable sulfur oxide acceptors embrace those materials which will associate with $SO_x$ in cooled oxygen-containing regenerator flue gases to form a solid material that is stable at the temperature of contact. Contact between particulate sulfur acceptor and cooled flue gas is carried out in a manner such that the particulate solid is suspended in the gases and is conveyed therein, preferably under turbulent conditions, to transfer $SO_x$ in the flue gas to the solid particles. The particulate sulfur oxide acceptor with bound $SO_x$ is then separated from flue gases now having a reduced $SO_x$ content. Optionally the separated solid sulfur oxide acceptor with bound $SO_x$ is processed external to the regenerator and external to the reactor by thermal or chemical means or a combination thereof to restore the solid to a state or condition whereby it is once again capable of being recycled in cooled flue gas in the presence of oxygen to pick up $SO_x$.

In one embodiment, the invention is practiced to reduce $SO_x$ emissions from FCC regenerators operating in conventional mode, i.e., regenerators emitting flue gases containing less than 0.5% $O_2$ and containing at least 500 ppm CO. The flue gases are cooled to a temperature below 1300° F., preferably below 1100° F., downstream from regenerator cyclones and then air or oxygen is injected external to the regenerator whereby CO combustion is precluded and interference with the operation of the regenerator is avoided. Practice of the invention permits introduction of oxygen to regenerator gases while avoiding afterburning or change-over to complete combustion. Suspendable particles of metal oxide may be injected and suspended in the oxygen-enriched regenerator gases external to the regenerator. Contrary to prior art practice, $SO_x$ pickup takes place downstream of regenerators and reactors, e.g., in flue gas lines, and the $SO_x$ acceptor is not cycled between reactor and regenerator. When acceptor particles of suitable chemical composition are used they may be introduced into the regenerator, but they are not recycled to the reactor as in prior art practice.

In another embodiment, principles of the invention are utilized to reduce $SO_x$ in flue gas from regenerators operated in complete CO combustion mode (i.e., at least 0.5% $O_2$ and less than 500 ppm CO). The metal oxide is contacted with flue gases previously cooled below about 1300° F., downstream of the cyclones. Air (oxygen) is injected into the cooled flue gases if necessary. Metal oxide is introduced to the cooled flue gas either external to the regenerator (e.g., in the flue gas line) or into the regenerator at any suitable point.

By the system of the invention, all or essentially all finely divided particles of the $SO_x$ acceptor are removed with flue gases and the agent for removing $SO_x$ is not present in the reactor as a diluent which reduces activity of the catalyst charge in the reactor. The invention may be practied in a manner such that the agent for removing $SO_x$ is also not present in the regenerator. This also represents a departure and offers advantages over those prior art techniques which require the presence of the agent for binding $SO_x$ in the regenerator, thus placing limitations on the composition and quantity of such agent that could be used without impairing the operation of the regenerator.

Another major point of distinction is that in the present invention oxygen conducive to conversion of gaseous oxides of sulfur to stable solid sulfate formation is introduced into previously cooled flue gas. This prevents undesired temperature rise in the regenerator with the potential of afterburning or excessive temperature rise. The temperature to which the flue gas can be cooled can be flexibly altered without upsetting the operation of the regenerator to facilitate utilization of any selected $SO_x$ acceptor at a temperature thermodynamically most favorable to that acceptor. This flexibility was not possible in the past because of constraints imposed by the need to utilize the sulfur acceptor under conditions dictated by the need to operate units in heat balance. Improved opportunity for $SO_x$ association is provided because the solid acceptor can be considerably finer than would be possible if such material or a major part had to be retained in the regenerator and the reactor. Additionally the invention affords favorable contact conditions for transferring $SO_x$ to a solid sulfur oxide acceptor by permitting contact of a finely divided solid with the flue gas stream under turbulent conditions.

DESCRIPTION OF THE DRAWING

Typical apparatus for practice of the invention is shown in the diagrammatic elevation in the single FIGURE of a typical regenerator section of an FCC annexed hereto. As illustrated in that diagram, conduit 2 is used to transfer hot stripped catalyst from the lower portion of the reactor stripping zone to the regeneration zone shown in the drawing. The regenerator may be of any desired style, but is preferably designed and operated to yield regenerated catalyst at minimum residual coke level after regeneration in either a conventional or complete combustion modes.

A modern version of regeneration is characterized by "fast fluid" riser to which catalyst suspended in regeneration gas is supplied from a dense fluidized bed undergoing regeneration at high temperature. The spent catalyst from the reactor and hot catalyst separated at the top of the riser are both introduced in the dense fluidized bed where the "fire" for regenerating spent catalyst is lighted by the hot regenerated catalyst so recycled. See U.S. Pat. Nos. 3,893,812 and 3,926,778.

As seen in the annexed drawing, spent catalyst passes by conduit 2 to a lower section of the regenerator, where it is fluidized along with the recycled hot regenerated catalyst from conduit 3 with air introduced by conduit 4. The resulting mixture passes upwards through conduit 4 to an enlarged lower section 5 of the regenerator where it enters a dense fluidized bed maintained by the regeneration gas. Catalyst from the dense bed in section 5 is entrained by hot regeneration gas to pass upward through a riser 6 to discharge port 7 into enlarged disengaging zone 8. Disengaging zone 8 may be equipped with a plurality of cyclone separator combinations comprising first and second cyclonic separation means attached or spaced apart from the riser discharge for separating catalyst particles from the regeneration gas, as is customary in the art. A single stage of separation is shown. Catalyst separated from regeneration gas in cyclone 9 flows downward through dipleg 10 and collects as a fluidized bed in the lower portion of disengaging zone 8 about riser 6. A portion of the hot catalyst collected is recycled by line 3 back to the bed in the lower section 5 for the purpose stated. Another portion for return to the reactor section is withdrawn by line 11.

Hot regenerator fume essentially free of catalyst exists the cyclonic separation 9 and enters plenum chamber area 12 where the fume can be quenched to the desired temperature by water or steam through the temperature controller sensor located in the flue gas line 13, which controls the valve 14 in the water/steam line. In conjunction with this quench system or as an alternate system, steam generator 15 could be used to lower the fume to the desired temperature.

After quenching to below 1300° F. in the complete combustion mode or below 1100° F. in the conventional mode, air or oxygen is injected through line 16 into flue gas line 13 controlled at between 0.5 and 3 mole percent oxygen by oxygen analyzer 17. The $SO_x$ acceptor is injected through line 18. Its rate of injection is determined by the $SO_2$ analyzer 19 so that the exiting flue gas after treatment for removal of the $SO_x$ acceptor particles is essentially free of $SO_x$.

DESCRIPTION OF SPECIFIC EMBODIMENTS

In preferred embodiments, the invention contemplates cooling regenerator flue gas from FCC units and contacting the cooled flue gas in the presence of free oxygen with a finely divided solid metal compound capable of reacting with or sorbing $SO_x$ under conditions to favor transfer of $SO_x$ from the flue gas to the finely divided solid metal compound. A typical metal sulfate formed by the contact exhibits a vapor pressure which determines the minimum level of $SO_x$ which must exist in the vapor phase for any particular temperature. The higher the temperature, the higher the vapor pressure resulting in a higher concentration of $SO_x$ in the vapor phase at the expense of sulfur bound to the solid sulfur acceptor. The amount of sulfur removed as a stable solid oxide of sulfur, e.g., sulfate, by the sulfur acceptor upon separation from the flue gases is constrained by the temperature and contact conditions between the flue gas and solid acceptor.

That constraint is avoided in large part and other advantages obtained by injecting a stream of very finely divided metal compound capable of forming a stable sulfate in contact with a cooled stream of regenerator flue gas containing air (oxygen) added downstream from the regenerator cyclones, whereby $SO_x$ acceptor and flue gas are contacted at a lower temperature (lower $SO_x$ vapor pressure) than that prevailing in the regenerator proper and in the presence of oxygen that could not be introduced upstream of a regenerator operating in conventional mode. It is preferred that the reduced temperature contact of solid acceptor with flue gas be on a full-flow basis; that is, the total stream of flue gas be contacted at reduced temperature with the total stream of particulate solid acceptor as shown in the annexed drawing. The invention will be further discussed with respect to that full-flow basis, but it will be apparent to those skilled in the art how the invention may be applied to a lesser stream of flue gas by diverting a portion of flue gas directly to heat recovery and stack.

For the purpose discussed, the invention contemplates conveying regenerator vapors separated from catalyst particles in whole or part, through a heat exchange zone, such as a heat exchanger or steam generator, to reduce the temperature of the vapors below about 1300° F., and preferably below 1100° F. for a conventional regenerator. Preferably the gas will be cooled at least 100° F. below the temperature at the point at which the flue gas and regenerated catalyst were separated in the disengaging zone. This value is subject to variation depending principally on the chemical composition of the solid sulfur oxide acceptor. When the regenerator is operated to produce incomplete combustion of the coked catalyst particles, and temperatures are at least about 1100° F. and up to about 1250° F. at the point of separating flue gas from regenerated catalyst, the flue gas will be cooled to a temperature most preferably below 1100° F., for example to a temperature in the range of abut 400° to 1050° F. On the other hand, when the regenerator is operated to maintain a temperature above 1300° F., up to about 1450° F., and regenerating air is used to achieve major conversion of CO to $CO_2$, there is no problem of CO combustion in the flue gas lines or other equipment. In this case flue gas can be cooled to temperatures as low as about 400° F. to below 1300° F., e.g., to 400° F. to 1250° F.

It will be apparent that a solid acceptor capable of binding $SO_x$ in the presence of oxygen will take up those compounds in the flue gas line in an amount to approximate thermodynamic equilibrium with the regenerator flue gas under conditions of contact time and temperature conducive to establishing equilibrium. At the lower temperature of contact with cooled regenerator flue gas, the $SO_x$ acceptor will be capable of picking up more $SO_x$ than would be possible if the contact were at the normal temperature of flue gas exiting the disengaging zone of the regenerator.

It will also be apparent that it is essential to precool flue gas containing CO before introducing air to promote $SO_x$ pickup since afterburning would result if the reverse sequence were to be followed. It is immaterial from a theoretical point of view whether cooling is applied before the solid $SO_x$ acceptor is introduced into the flue gases. However, for practical reasons it is preferred that cooling be applied to the flue gas in the absence of solid $SO_x$ acceptor. The degree of cooling from regenerator temperature will be significant, at least 25° F. and preferably at least 100° F. as mentioned above, in order that theacceptance of $SO_x$ by the solid acceptor shall be increased a significant amount to achieve the advantage of increased $SO_x$ uptake at reduced temperature.

The solid reactant can be introduced into the regenerator in well-known manner when the regenerator is one that operates in full combustion mode with the proviso that such material is either initially (as charged) in the form of particles 40 microns or finer, preferably 20 microns or finer, or that the material is introduced as particles attritable in the regenerator to particles 40 microns or finer. When the regenerator is operated under conditions of incomplete combustion and flue gases contain carbon monoxide, the solid sulfur oxide acceptor is preferably introduced in the flue gas line in the form of particles 40 microns or finer when the acceptor includes one or more components capable of promoting or otherwise interfering with the operation of the regenerator. An example would be a material capable of promoting combustion by catalytic or other effect. When the regenerator is operated under the incomplete combustion mode and the acceptor does not contain such interfering material, it is entirely feasible and within the scope of the invention to inject the acceptor into the regenerator. Examples of acceptors that can be utilized in this manner are those composed of a Group II metal compound, e.g., calcium and/or magnesium oxide.

To facilitate separation of the sulfur oxide—loaded acceptor particles from sulfur oxide depleted flue gas, it may be advantageous to inject into the flue gas acceptor particles that are significantly larger than 40 microns, for example particles in the size range of $\frac{1}{8}''$ to 60 microns. The upper limit of particle size is dictated by the need to employ particles capable of being suspended in the flue gas and conveyed therein. This size will therefore vary with the velocity of the gas in the flue gas line. A suitable particle size may be determined applying considerations well within the skill of the art.

A large number of oxides and combinations of oxides for reaction with $SO_x$ are described in patents and technical literature such as cited above. These are all potentially capable of being utilized with improved results when principles of this invention are applied. In general, the oxides are those which form sulfates with $SO_x$ in the presence of free oxygen, the sulfates being stable at the temperature of cooled gases produced in a regenerator. The solids are "stable" in the sense that they do not melt, sublime or decompose at such temperatures. Among the oxides earlier described for the purpose mentioned and which may be used in practice of the invention are reactive oxides of alumina as described in U.S. Pat. No. 4,071,436; oxides of Group IIA metals, typified by calcium and magnesium set forth in U.S. Pat. No. 3,699,037; cerium oxides as described in U.S. Pat. No. 4,001,375; and the several metal components described in German Offenlegungschrift DT No. 2657403, including compounds of sodium, scandium, titanium, iron, chromium, molybdenum, magnesium, cobalt, nickel, antimony, copper, zinc, cadmium, rare earth metals and lead. These metals are of varing effectiveness at different temperatures and application of the knowledge and skill of the art to the conditions of a particular situation will indicate the optimum temperature for use.

The invention expands considerably upon the composition of metal compounds that can be used as a practical manner since there is no need to restrict compound to a metal oxide which will repeatedly bind $SO_x$ in flue gas and release bound $SO_x$ as $H_2S$ in the reactor since the $SO_x$ acceptor is not cycled to the reactor in practice of the invention and it need not be associated with catalyst inventory in the regenerator. Thus inexpensive materials such as Group II metal or other Group II metal compounds such as hydroxides and carbonates can now be employed in effective manner. Oxides which would have an adverse effect on the cracking operation such as sodium aluminates or caustic treated bauxite ore are usable.

When practicing the invention to reduce $SO_x$ emissions in a unit in which regeneration is operated under conventional mode and the flue gas containing CO is sent to a CO boiler, it will be necessary to avoid use of an acceptor such as alumina or rare earth metals that will decompose to release $SO_x$ in the boiler. For this application, compounds of Group II metals, especially calcium oxide, magnesium oxide, or mixtures thereof, are recommended.

In representative practice of the present invention in a conventional FCC unit operating at a 1200° F. dense phase regenerator temperature and a 1250° F. flue gas temperature with the two stage regenerator cyclones discharging at 105 fps into a plenum chamber, water would be injected into the plenum chamber to cool the flue gas below 1100° F. to eliminate the possibility of burning carbon monoxide when the air is injected into the flue gas line. The flue gas line superficial velocity of about 100 fps insures good mixing of the air as it is injected into the entrance of the flue gas line just downstream of the regenerator plenum chamber to control the oxygen level at 2 volume percent. At the first 90° elbow in the flue gas line the $SO_x$ adsorber, for example minus 20 micron gamma alumina, is introduced to react with the $SO_x$ to form a stable sulfate. This material is entrained with the flue gas through the flue gas slide valve, pressure reducing chamber, the CO boiler and finally into the flue gas electrostatic precipitator where it is recovered with the catalyst fines.

It is to be understood that the foregoing description is merely illustrative of preferred embodiments of the invention of which many variations may be made by those skilled in the art within the scope of the following claims without departing from the spirit thereof.

I claim:

1. A cyclic process for the catalytic cracking of a sulfur-containing hydrocarbon charge comprising:
   (a) cracking a sulfur-containing hydrocarbon charge by contacting it with a cracking catalyst in a cracking zone and at a cracking temperature;
   (b) depositing a carbonaceous deposit containing sulfur on the cracking catalyst during step (a);
   (c) removing the cracking catalyst having a carbonaceous deposit containing sulfur deposited on it from the cracking zone and introducing it into a regeneration zone;
   (d) regenerating the cracking catalyst in the regeneration zone by contacting the catalyst with air at a temperature of at least about 1100° F. to burn the carbonaceous residue off the catalyst and thereby produce regenerated catalyst and flue gas comprising oxides of sulfur;
   (e) removing the flue gas and the regenerated catalyst from the regeneration zone;
   (f) returning the regenerated catalyst to the cracking zone;
   (g) cooling the flue gas to a temperature at least about 100° F. below its temperature in the regeneration zone;
   (h) adding to the cooled flue gas a particulate solid from a source separate from the cracking catalyst, said particulate solid comprising a metal compound;
   (i) in the presence of oxygen, suspending the particulate solid in the cooled flue gas to reduce the quantity of oxides of sulfur in the flue gas by chemical reaction.

2. The process of claim 1 wherein the flue gas is cooled to a temperature of about 400°–1100° F.

3. The process of claim 1 wherein the flue gas in the regeneration zone has a temperature of about 1100°–1450° F.

4. The process of claim 1 wherein the suspension made in step (i) is subjected to turbulent flow.

5. The process of claim 4 wherein the turbulent flow takes place in a flue gas line.

6. The process of claim 1 wherein the flue gas is cooled by contacting it with water or steam.

7. The process of claim 1 wherein the flue gas is cooled by passing it through a heat exchanger.

8. The process of claim 1 wherein the particulate solid comprises particles that are 40 microns or finer.

9. The process of claim 8 wherein the particulate solid comprises particles that are 20 microns or finer.

10. The process of claim 1 wherein: (a) the flue gas removed from the regeneration zone in step (e) contains less than 0.5% oxygen and at least 500 parts per million carbon monoxide; (b) the flue gas is cooled to below 1100° F. in step (g); and (c) an oxygen containing gas is added to the cooled flue gas in a manner so that there is no substantial combustion of the carbon monoxide in the flue gas to obtain a suspension of particulate solid in cooled flue gas and oxygen containing gas.

11. The process of step 10 wherein the suspension of particulate solid in cooled flue gas and oxygen containing gas is subjected to turbulent flow.

12. The process of claim 11 wherein the turbulent flow takes place in a flue gas line.

13. The process of claim 4 wherein the particulate solid comprises particles that are 40 microns or finer.

14. The process of claim 13 wherein the particulate solid comprises particles that are 20 microns or finer.

15. The process of claim 1 wherein the metal compound that reduces the quantity of oxides of sulfur in the flue gas by chemical reaction comprises calcium oxide, magnesium oxide, aluminum oxide or mixtures thereof.

16. The process of claim 4 wherein the metal compound that reduces the quantity of oxides of sulfur in the flue gas by chemical reaction comprises calcium oxide, magnesium oxide, aluminum oxide or mixtures thereof.

* * * * *